United States Patent [19]

Sugiura et al.

[11] Patent Number: 5,483,060

[45] Date of Patent: Jan. 9, 1996

[54] OPTICAL POSITION SENSOR AND ISOLATION SENSOR USING THIS POSITION SENSOR

[75] Inventors: Wataru Sugiura, Anjyo; Katsuteru Miwa, Kariya, both of Japan

[73] Assignee: Nippondenso Co., Ltd., Kariya, Japan

[21] Appl. No.: 107,319

[22] Filed: Aug. 17, 1993

[30] Foreign Application Priority Data

Aug. 19, 1992 [JP] Japan .................................. 4-220301
Jul. 8, 1993 [JP] Japan .................................. 5-169290

[51] Int. Cl.⁶ .................................................. G01B 11/26
[52] U.S. Cl. ............................ 250/237 R; 250/203.4; 250/203.6; 250/206.1; 250/206.2
[58] Field of Search ........................... 250/203.4, 237 R, 250/203.6, 206.1, 206.2; 356/141, 152

[56] References Cited

U.S. PATENT DOCUMENTS

| 3,478,219 | 11/1969 | Nutz | 250/203.4 |
| 4,018,532 | 4/1977 | Fletcher et al. | 250/203.4 |
| 4,857,721 | 8/1989 | Dunavan et al. | 250/206.1 |
| 4,874,937 | 10/1989 | Okamoto | 250/206.2 |
| 5,117,744 | 6/1992 | Zimmer et al. | 454/75 |

FOREIGN PATENT DOCUMENTS

| 56-64611 | 6/1981 | Japan . |
| 63-141816 | 6/1988 | Japan . |

Primary Examiner—William L. Sikes
Assistant Examiner—Fetsum Abraham
Attorney, Agent, or Firm—Cushman, Darby & Cushman

[57] ABSTRACT

In an optical position sensor capable of detecting a direction of incidence of light and intensity, this invention contemplates to make the sensor compact by reducing the number of pixels constituting light reception sensors and reducing the light reception area. To accomplish this object, a detection element portion 10 comprises a glass substrate 22, a light shading film 24 formed on a surface of the glass substrate 22 and having mutually criss-crossing slits 24a, 24b and a light reception portion 26 fixed to the back of the glass substrate 22. Unidimensional photo-diode arrays 26X, 26Y for receiving the slit beams passing through the slits 24a, 24b respectively, and a signal processing circuit 28 for scanning the photo-diode arrays 26X, 26Y and taking out light reception signals are disposed in the light reception portion 26.

27 Claims, 7 Drawing Sheets

OPTICAL POSITION SENSOR AND ISOLATION SENSOR USING THIS POSITION SENSOR

BACKGROUND OF THE INVENTION

1. The Field of the Invention

This invention relates to an optical position sensor capable of detecting an incident direction of light and its intensity. More particularly, it relates to an optical position sensor suitable for controlling a temperature of air-conditioned air, an air blow-out quantity and a blow-out direction in an air-conditioner for a car.

The present invention relates also to an insolation sensor using the optical position sensor described above.

2. Description of the Related Art

An optical position sensor capable of detecting an insolation direction and an insolation intensity has been used in the past in an air-conditioner for a car in order to optimally control the temperature, blow-out quantity blow-out direction of air-conditioning air in accordance with the intensity of the insolation and its direction.

The optical position sensor of the kind described above is disclosed, for example, in the following references.

(A) An insolation sensor disclosed in Japanese Unexamined Patent Publication (Kokai) No. 63-141816, wherein three light reception sensors for directly receiving solar rays are disposed so as to be directed in mutually different directions.

(B) A solar angle measurement apparatus disclosed in Japanese Unexamined Patent Publication (Kokai) No. 56-64611 wherein tow sensors each comprising a light shading plate having a slit formed thereon and a gray code pattern disposed so as to oppose the light shading pattern are arranged in a manner such that the slits perpendicularly cross each other.

(C) A solar angle measurement apparatus similarly disclosed in Japanese Unexamined Patent Publication (Kokai) No. 56-64611 which comprises a light shading plate having pin holes bored therein and two-dimensional light reception sensors disposed so as to oppose the light shading plate.

However, the light reception portion for effecting optical detection in each of the position sensors (A) to (C) is relatively large, and it is difficult to reduce the size of the position sensors.

In the insolation sensor of the reference (A), three light reception sensors must be disposed in mutually different directions. Therefore, the light reception portion must be formed three-dimensionally, and the insolation sensor cannot be made compact in size. Because this insolation sensor requires three light reception sensors, the cost of production becomes high.

Next, in the solar angle measurement apparatus (B), a gray code pattern consisting of a large number of light reception devices is used for detecting the position of light passing through a slit. For this reason, the light reception portion need not be formed three-dimensionally as is required in the apparatus (A).

However, because the gray code pattern is formed by aligning a large number of photo-electric conversion by aligning a large number of photo-electric conversion devices along the gray code, the light reception portion has a two-dimensional expansion and its light reception is large. Further, because this solar angle measurement apparatus uses two sensors each having a light reception portion having such a two-dimensional expansion that are aligned in such a manner that each slit perpendicularly crosses the other, a light reception area that is at least twice as large as the light reception area of the two gray code patterns is necessary for the apparatus as a whole. Accordingly, it is not possible to reduce the size of this solar angle measurement apparatus. To correctly detect the position of light passing through the slits by the gray code pattern, the relative positions between the gray code pattern and the slits must be correctly adjusted, and this results in another problem that the production rate the apparatus is low.

On the other hand, the solar angle measurement apparatus (C) comprises the light shading plate having the pin-holes bored therein and the two-dimensional light reception sensors so disposed as to appose the light shading plate. Therefore, this apparatus can be made more compact than the apparatuses (A) and (B) described above.

However, because apparatus (C) also uses the two-dimensional light reception sensors, the light reception portion has a two-dimensional expansion in the same way as in the apparatus (B), and its light reception are becomes inevitably large.

Further, this apparatus requires a signal processing circuit for processing the light reception signals from photo-electric conversion devices (pixels) constituting the light reception sensor. However, because a large number of pixels are two-dimensionally disposed in the light reception sensor, vertical and horizontal scanning circuits must be provided in the signal processing circuit so as to scan two-dimensionally the light reception sensor. As a result, problems occur in that the circuit construction gets complicated and the signal processing circuit becomes large in size.

When the signal processing circuit is built into the apparatus, the substrate must have the sum of the light reception area of the light reception sensor and the circuit area of the signal processing circuit in order to form the signal processing circuit and the light reception sensor on the same substrate., and, as a result, the apparatus is large in size.

To reduce the size of this apparatus, it would be conceivable to separately form the signal processing circuit and the light reception sensor. In this case, however, a large number of pixels that constitute the light reception sensor must be electrically connected to the signal processing circuit by individual signal lines. Accordingly, the number of signal lines for the connection becomes enormous, and the assembly work of these signal lines gets complicated and producibility drops.

Accordingly, in the solar angle measurement apparatus (C), reducing the size of the apparatus without lowering the production rate has been difficult.

SUMMARY OF THE INVENTION

In view of the problems with the prior art described above, the present invention reduces the size of an optical position sensor capable of detecting an incident direction of light and its intensity by the use of a light reception sensor, which can be formed on a flat surface substrate, such as the solar angle measurement apparatus (C) described above, without lowering the production rate by reducing the number of pixels constituting the light reception sensor and reducing the light reception area.

It is another object of the present invention to provide an insolation sensor using the optical position sensor described above.

To accomplish the objects described above, an optical position sensor according to the present invention comprises a light shading plate having two slits serving as light introduction ports and disposed so as to cross each other either directly or on the extension thereof, and a light reception portion including a pair of unidimensional light reception sensors disposed so as to oppose the light shading plate with a predetermined gap between them, and formed by aligning a plurality of photo-electric conversion devices in such a manner as to cross each of the slits at a position opposing each of the slits.

In the optical position sensor according to the present invention, light irradiated onto the light shading plate is in the form of solar rays.

In the optical position sensor according to the present invention, a transparent member having a predetermined refractive index greater than 1 is interposed between the light shading plate and the light reception portion.

In the optical position sensor having the construction as described above, rays of light passing through the two slits formed in the light shading plate are received by a pair of unidimensional light reception sensors formed at the light reception portion. Therefore, the incident direction of light and its intensity can be detected by detecting the light receiving position and intensity of light received at each light reception sensor.

Assuming that the light to be detected in the optical position sensor according to the present invention is solar rays, the solar rays irradiate the light shading plate. Therefore, the solar rays passing through the two slits formed in the light shading plate are incident into the light reception portion. Accordingly, the incident direction and intensity can be determined by detecting the light reception position and the intensity of received light at each light reception sensor. In other words, the optical position sensor can be used as an insolation sensor.

In the optical position sensor according to the present invention, the rays transmitted through the two slits formed in the light shading plate are incident into each light reception sensor through the transparent member having a predetermined refractive index which is greater than 1. Accordingly, in comparison with the case where the light shading plate and the light reception portion are merely so disposed as to oppose each other, the change of the light reception position on each light reception sensor with respect to the change of the incident angle of the rays of light entering into the light shading plate can be reduced the change to the light reception position on each light reception sensor with respect to the change of the incident angle of the rays of light entering into the light shading plate can be reduced.

DESCRIPTION OF THE PREFERRED EMBODIMENTS

Hereinafter, the preferred embodiments of the present invention will be described with reference to the accompanying drawings.

Figure 2:
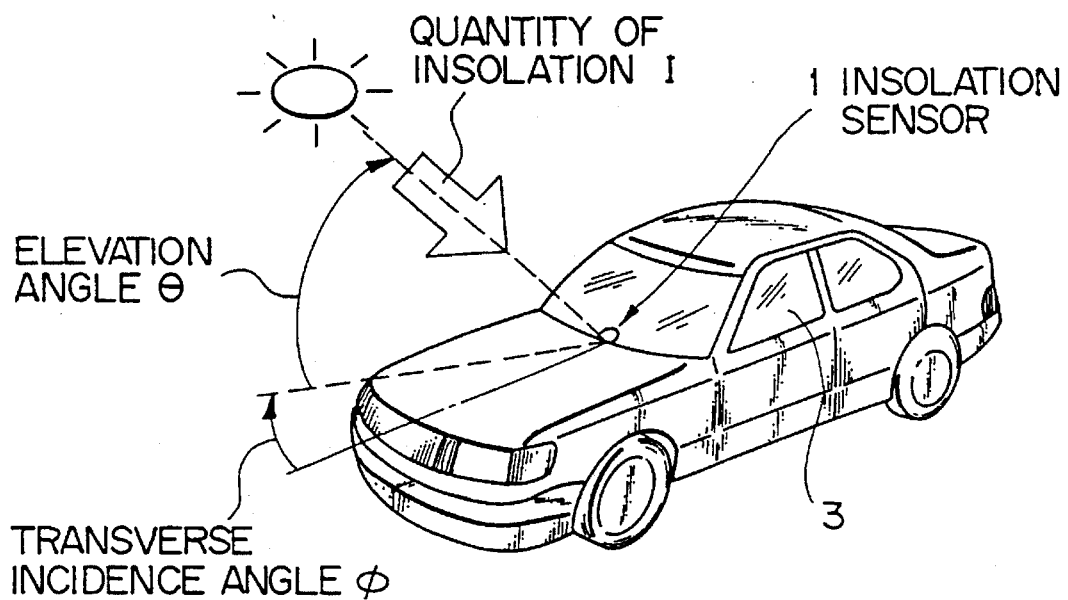
FIG. 2 is an explanatory view showing the optical position sensor of FIGS. 1A and 1B provided in a car.

An optical position sensor 1 according to this embodiment is a so-called "insolation sensor" which is fitted at a front position inside of a car 3 and detects an intensity I of insolation incident into the inside of the car and its direction. The direction of insolation is resolved into a transverse angle of incidence $\phi$ with a travelling direction of the car being the reference, and an elevation angle $\theta$ representing the height of insolation, as shown in FIG. 2. This sensor is used for controlling the temperature of air-conditioning air, a blowing quantity and blowing direction in an air-conditioner for the car.

Figure 3:
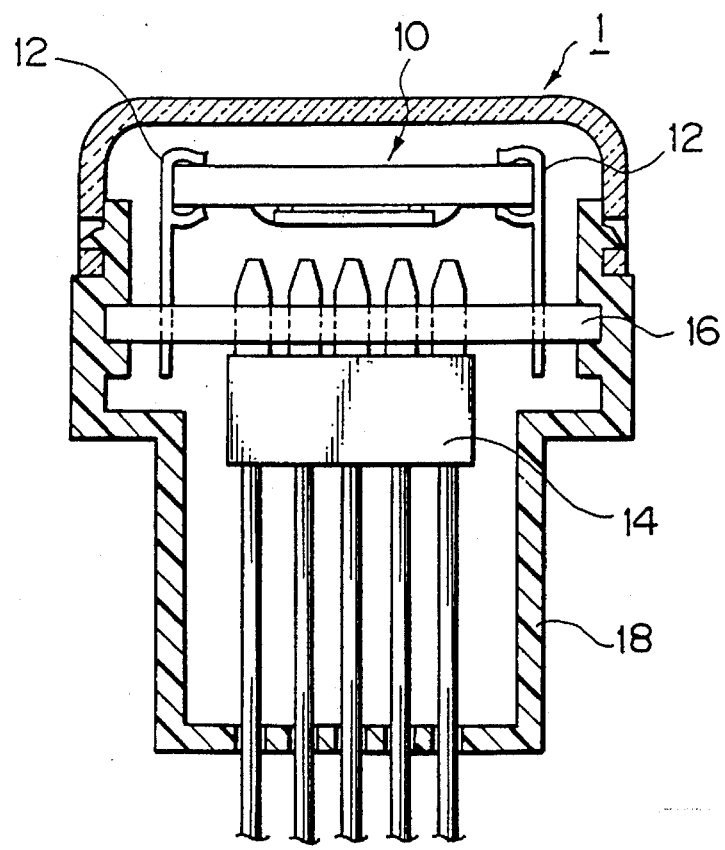
FIG. 3 is a sectional view showing the overall structure of the optical position sensor 1.

As shown in FIG. 3, the optical position sensor 1 comprises a detection element portion 10, clip terminals 12 serving as electrodes of the detection element portion 10, a printed circuit board 16 for holding the detection element portion 10 through the clip terminals 12 and electrically connecting the detection element portion 10 to a microcomputer 30 (FIG. 5) for air conditioning control, which will be described later, by connecting an external connector 14 to the clip terminals 12, a cylindrical casing 18 for holding the printed board 16 and allowing the detection element portion 10 to protrude from an open portion, and a light transmissible filter 20 fitted and fixed to the edge of the opening of the cylindrical casing 18, for covering and protecting the detection element portion 10.

Figure 1A:
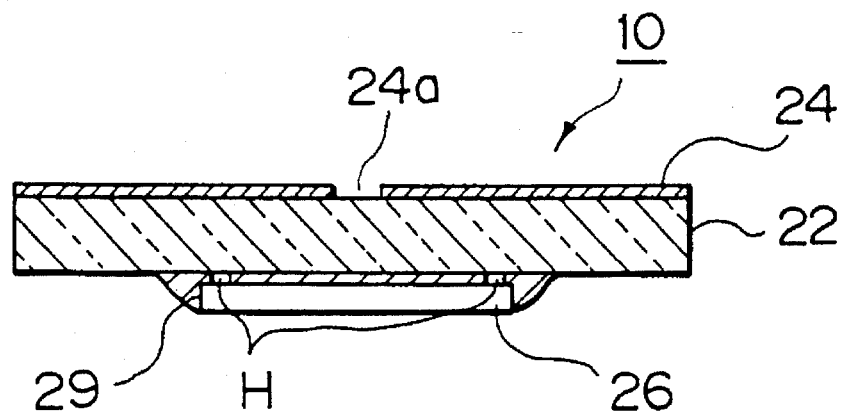
FIGS. 1A and 1B are explanatory vies showing the structural of a detection element portion 10 of an optical position sensor 1.

The detection element portion 10 comprises a glass substrate as the transparent member described already, which has a refractive index of 1.5, a light shading film 24 as the light shading sheet described already, which is formed on the surface of the glass substrate 22, and a light reception portion 26 fixed to the back of the glass substrate 22, as illustrated in FIG. 1A.

Figure 1B:
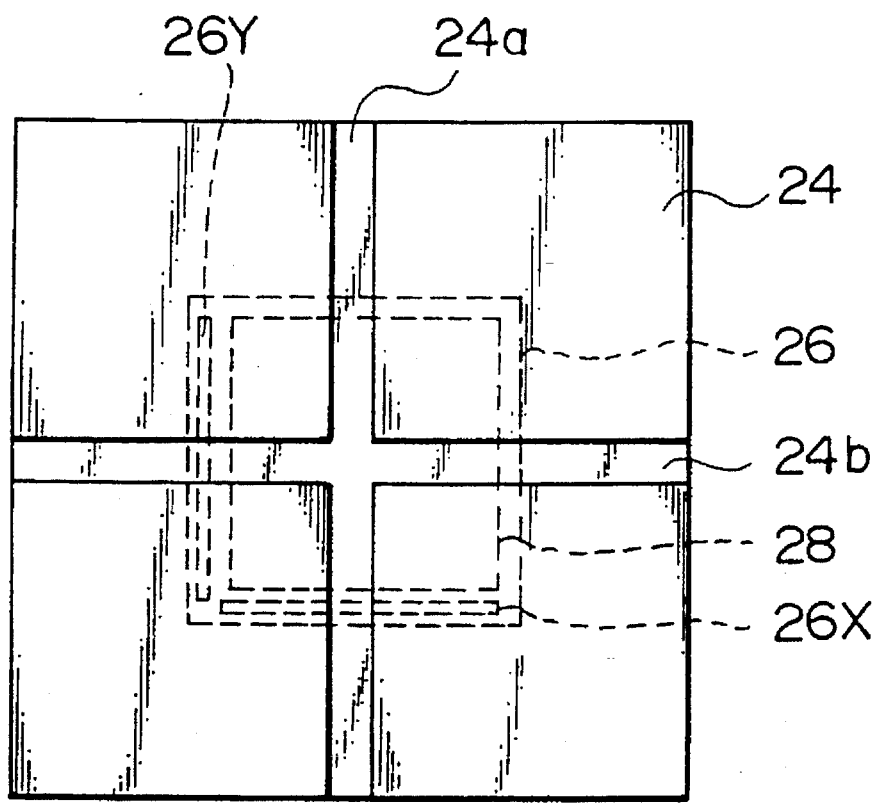

Two slits 24a and 24b, which criss-cross each other and have a width of 0.6 mm are formed on the surface of the glass substrate 22 as shown in FIG. 1B. In other words, the light shading film 24 cuts off the solar rays at portions other than these slits 24a, 24b, and is formed by printing, etc.

On the other hand, the light reception portion 26 includes photo-diode arrays 26X, 26Y as a unidimensional light reception sensor which are so disposed as to crisscross the slits 24a, 24b at the opposed positions of these slits 24a, 24b, and a signal processing circuit 28 for sequentially taking out light reception signals from photo-diodes constituting the photo-diode arrays 26X, 26Y by scanning them, as shown in FIG. 1B.

Each of the photo-diode arrays 26X, 26Y is formed by linearly aligning 100 photo-diodes each having a cell size of 0.004 mm×0.04 mm on a chip as a main body of the light reception portion 26, and the signal processing circuit 28 comprises a circuit pattern formed on the chip of the light reception portion 26 and circuit devices disposed on the circuit pattern.

The light reception portion 26 is fixed to the glass substrate 22 by soldering the electrode pattern of the signal processing circuit 28 formed on the chip to the electrode pattern formed on the glass substrate 22 as indicated by symbol H in FIG. 1A, and the surface of the light reception portion 26 other than the solder portions is protected by a silicone gel 29 having a refractive index of 1.4 and interposed between the surface of the light reception portion 26 and the glass substrate 22.

When solar rays A are incident into the optical position sensor 1 of this embodiment having the construction described above as illustrated in FIG. 4, a part of the solar rays A pass through the slits 24a and 24b, become a slit beam B and irradiate a part of each photo-diode array 26X, 26Y in accordance with the direction of the insolation (that is, the angle of incidence $\phi$ of the solar rays and the elevation angle $\theta$).

Because the width of the slit beam is 0.6 mm with respect to the pixel size (cell size of the photo-diode) of 0.04 mm×0.04 mm, the number of pixels (the number of photo-diodes) irradiated at this time in each photo-diode array 26X, 26Y is about 15 (pixels), and the center pixel (Xm, Yn) of these fifteen pixels represents the center to the slit beam B.

Accordingly, if the position (Xm, Yn) of the center pixel irradiated by the slit beam B is detected in each photo-diode array 26X, 26Y, the center position P1 of the slit beam on the light reception portion 26 can be detected, and the angle of incidence $\phi$ and the elevation angle $\theta$ of the solar rays can be detected on the basis of the deviation of this center position P1 from the reference position P0 at the time when the solar rays A are incident from immediately above the optical position sensor 1.

By the way, when the incident beam from the slit 24b irradiates the photo-diode array 26X, this photo-diode array 26X cannot effect position detection. For this reason, it is disposed outside the position at which the incident beam from the slit 24b is refracted by the glass substrate 22 and is then allowed to irradiate when the sun is at a low altitude. Similarly, the photo-diode array 26Y cannot effect position detection when it is irradiated by the incident beam from the slit 24a. Accordingly, it is disposed outside the position at which the incident beam from the slit 24a is refracted by the glass substrate 22 and is then allowed to irradiate, when the sun is at a low altitude. As a result, only the incident beams from the slits 24a and 24b are allowed to irradiate the photo-diode arrays 26X and 26Y, respectively, and the center position P1 of the slit beam can always be detected.

Figure 5:
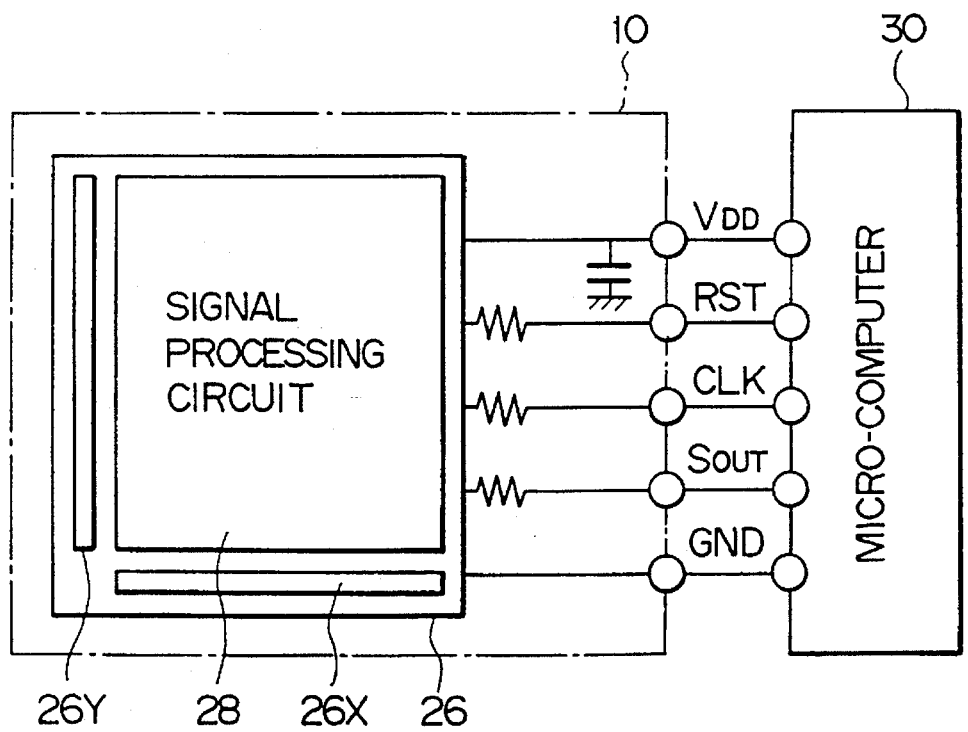
FIG. 5 is an explanatory view showing a connection state between the optical position sensor 1 and a microcomputer 30 for air conditioning control.

Next, the light reception portion 26 fixed to the glass substrate 22 described above is connected to the microcomputer 30 for controlling the air conditioner through the glass substrate 22, the clip terminals 12, the printed board 16 and the external connector 14, as shown in FIG. 5.

According to this electrical connection, the signal processing circuit 28 is connected to a power source terminal (VDD) and a ground terminal (GND) of the microcomputer 30, and receives the supply of the power (VDD) from the microcomputer 30. At the same time, the signal processing circuit 28 operates on receiving the reset signal (RST) and the clock signal (CLK) output from the microcomputer 30, and outputs a detection signal SOUT.

Hereinafter, the circuit construction and the operation of this signal processing circuit 28 will be explained.

Incidentally, capacitors and resistors are shown connected in a signal line between the microcomputer 30 and the light reception portion 26 in FIG. 5, and they are disposed so as to suppress the noise on the signal line and to protect the circuit. In this embodiment, they are disposed on the printed board 16.

Figure 6:
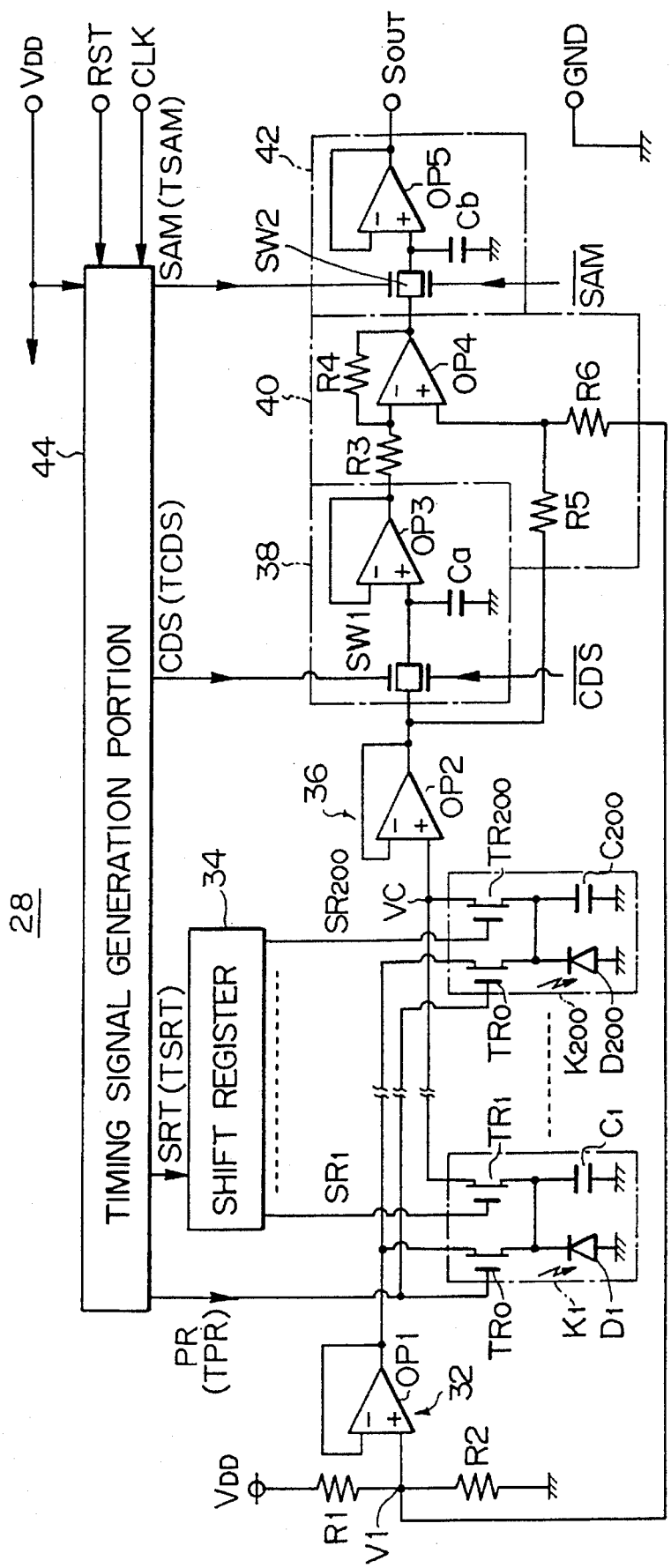
FIG. 6 is a circuit diagram showing a circuit in a signal processing circuit 28.

As shown in FIG. 6, the signal processing-circuit 28 has the following construction. Capacitors C1 to C200 are connected in parallel with each of 200 photo-diodes D1 to D200 constituting the photo-diode arrays 26X, 26Y, and CMOS type transistors TR1 to TR200 for outputting the terminal voltage of the capacitor C1 to C200 to the outside and a CMOS type transistor TR0 for charging the capacitors C1 to C200 is provided for each pixel. In this way, detection circuits K1 to K200 are formed for each pixel of the photo-diode arrays 26X, 26Y. In other words, the signal processing circuit 28 is constituted as a CMOS type image sensor which sequentially charges each of capacitors C1 to C200 to a reference voltage V1 for each detection circuit K1 to K200, and then detects a charge quantity discharged through each photo-diode D1 to D200 after the passage of a predetermined time from this charging, and outputs the charge quantity as a detection signal SOUT representing the quantity of light received by each photo-diode D1 to D200.

In other words, the signal processing circuit 28 includes potential divider resistors R1, R2 for dividing the power source voltage VDD and providing the reference voltage V1; a buffer circuit 32 comprising an operational amplifier OP1 for inputting the reference voltage V1 generated by the potential divider resistors R1, R2 to the transistor TR0 of each detection circuit K1 to K200 as the charge voltage to each capacitor C1 to C200; a shift register 34 for outputting a driving signal SRn for turning on the transistor Trn (n: any one of 1 to 200) of a specific detection circuit Kn for the passage of a pre-determined time from turn-on of the transistor TR0 of each detection circuit K1 to K200 at a predetermined charge timing (TPR) to the start the charging of each capacitor C1 to C200, and for sequentially changing over the detection circuit Kn outputting this driving signal Srn at a predetermined switching timing (TSRT) from the detection circuits K1 to K200; a buffer circuit 36 comprising an operational amplifier Op2 for taking out the terminal voltage VC of the capacitor Cn output from the detection circuit Kn, for which the shift register 34 outputs the driving signal Srn, through the transistor Trn; a hold circuit 38 for holding the output voltage from the buffer circuit 36 (that is, the terminal voltage of the capacitor Cn) at the timing immediately after the output of the driving signal Srn by the shift register 34, as a hold voltage VCH; a differential amplification circuit 40 for generating a signal proportional to the difference between the hold voltage VCH of the hold circuit 38 and the terminal voltage VC output from the buffer circuit 36 after the hold voltage VCH; an output circuit 42 for holding the output signal from the differential amplification circuit 40 at a predetermined timing (TSAM) and outputting it as a detection signal SOUT representing the quantity of received light by a specific pixel (that is, the photo-diode Dn); and a timing signal generation portion 44 for generating timing signals PR, SRT, CDS, SAM for driving the transistor TRU, the shift register 34, the hold circuit 38 and the output circuit 42 at the respective timings TPR, TSRT, TCOS, TSAM on the basis of the reset signal RST and the clock signal CLK from the microcomputer 30.

Incidentally, the hold circuit 38 comprises an analog switch SW1 which is turned ON when the timing signal CDS output from the timing signal generation portion 44 is at a high level and is turned OFF when the latter is at a low level, a capacitor Ca which is charged by the terminal voltage VC output from the buffer circuit 36 to the same potential as the terminal voltage VC at the time the analog switch SW1 is turned on, and an operational amplifier OP3 for outputting the terminal voltage (that is, VC) to the differential amplification circuit 40.

The differential amplification circuit 40 is of a known type comprising the operational amplifier OP4 and resistors R3 to R6. In this embodiment, the reference voltage V1 produced by the potential divider resistors R1, R2 is applied through the resistor R6 to a non-inverting input (+) of the operational amplifier OP4 for directly receiving the terminal voltage VC output from the buffer circuit 36, so that the voltage of the non-inverting input (+) attains a voltage (VC+ V1). In other words, the differential amplification circuit 40 outputs a voltage which is the difference obtained by subtracting the hold voltage VCH of the hold circuit 38 from the voltage (VC+V1) of this non-inverting input (+).

Further, the output circuit 42 comprises an analog switch SW2 which is turned ON when the timing signal SAM output from the timing signal generation portion 44 is at a high level and is turned OFF when the latter is at a low level, a capacitor Cb which is charged by the output signal from the differential amplification circuit 40 to the same potential as this output signal at the time the analog switch SW2 is turned on, and an operational amplifier OP5 for outputting the terminal voltage of this capacitor Cb as a detection signal SOUT.

In the signal processing circuit 28 described above, when the reset signal RST from the microcomputer 30 is at a low level, the timing signal generation portion 44 as well as the shift register 34 are reset. When the reset signal RST is at the high level, the timing signal generation portion 44 generates the timing signals TPR, TSRT, TCDS and TSAM described above in synchronism with the clock signal CLK from the microcomputer 30, and operates the transistor TR0, the shift register 34, the hold circuit 38 and the output circuit 42.

Figure 7:
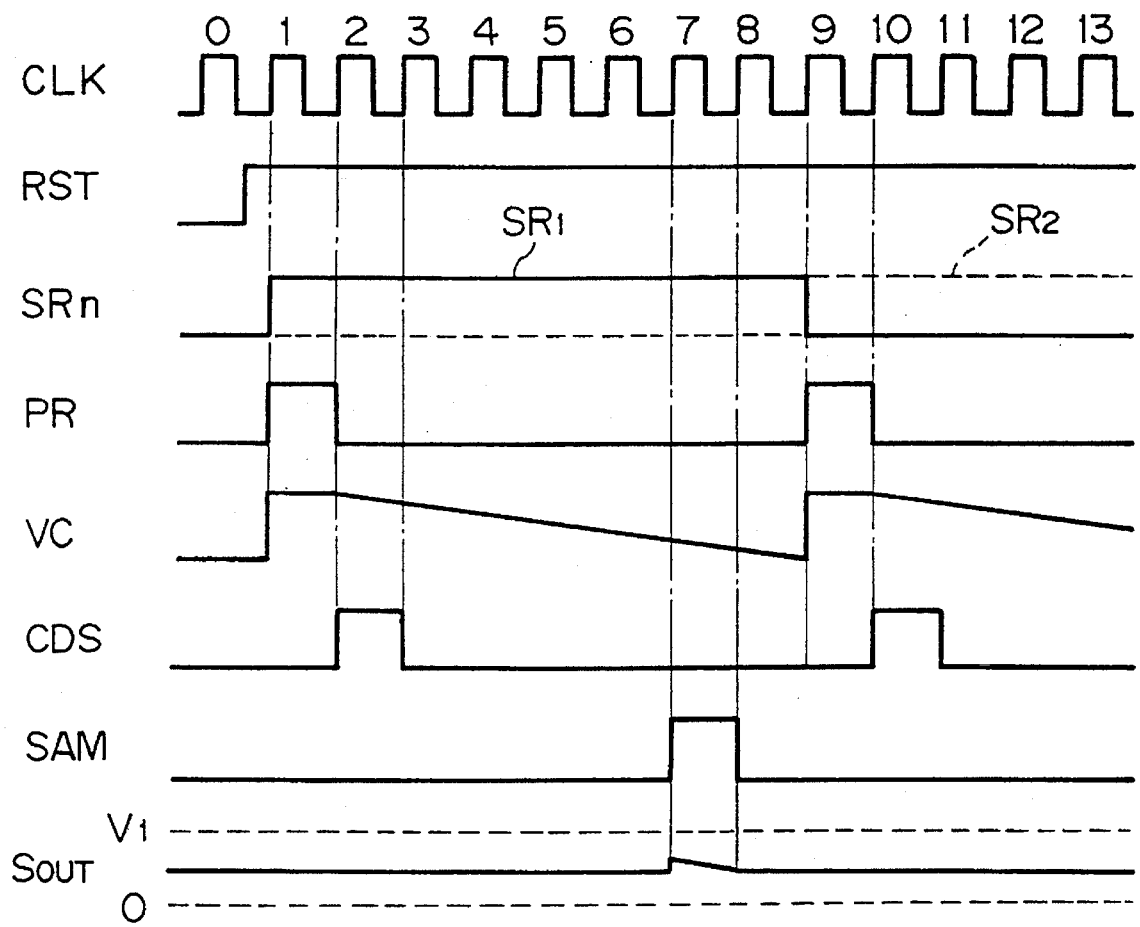
FIG. 7 is a timing chart useful for explaining the operation of the signal processing circuit 28.

In other words, as shown in FIG. 7, when the reset signal RST from the microcomputer 30 reverses from the low level to the high level, the timing signal generation portion 44 outputs the timing signals PR and SRT to the transistor TR0 and to the shift register 34, respectively, from the rise of the clock signal CLK1, which is input for the first time from the inversion of the reset signal RST to the rise of the clock signal CLK2 which is input next (the second clock signal).

In the meantime, the transistor TR0 is turned ON and the capacitors C1 to C200 of all the detection circuits K1 to K200 are charged to the reference voltage V1.

The shift register 34 outputs the driving signal SR1, the transistor TR1 of the detection circuit K1 is turned ON, and the terminal voltage VC of the capacitor C1 inside the detection circuit K1 is input to the buffer circuit 36. This state lasts until the timing signal SRT is input next to the shift register 34.

Next, the timing signal generation portion 44 outputs the timing signal CDS from the rise of the second clock signal CLK2 to the rise of the clock signal CLK3 input next (the third clock signal), and turns ON the analog switch SW1 of the hold circuit 38.

In the meantime, the terminal voltage VC of the capacitor C1 inside the detection circuit K1 is input to the hold circuit 38 through the buffer circuit 36, and the hold circuit 38 holds this terminal voltage VC as the hold voltage VCH. In other words, the hold circuit 38 holds the terminal voltage VC of the capacitor C1 immediately after charging of the capacitor C1 to the reference voltage V1.

Thereafter, the clock signals CLK are sequentially input from the microcomputer 30, and when the seventh clock signal CLK7 is input, the timing signal generation portion 44 outputs the timing signal SAM from the rise of this seventh signal to the rise of the next (eighth) clock signal CLK8, and turns ON the analog switch SW2 of the output circuit 42.

In the meantime, the output signal from the differential amplification circuit 40 is input to the output circuit 42, and then the output circuit 42 outputs this signal as the detection signal SOUT representing the quantity of received light by the photo-diode D1.

The charge accumulated in the capacitor C1 is discharged in accordance with the quantity of light received by the photo-diode D1 during the period from holding of the terminal voltage VC of the capacitor C1 by the hold circuit 38 to holding of the output signal of the differential amplification circuit 40 by the output circuit 42. Accordingly, the output voltage of the differential amplification circuit 40 output as the detection signal SOUT by the output circuit 42, that is, (VC+V1−VHC), becomes smaller with a greater quantity of received light in accordance with the quantity of received light of the photo-diode D1.

When the beam does not at all irradiate the photodiode D1, the charge accumulated in the capacitor C1 is not discharged. Therefore, the terminal voltage VC of the capacitor C1 does not change from the reference voltage V1 and the detection signal SOUT is the reference voltage V1.

When the output circuit 42 holds the output signal of the differential amplification circuit 40 and outputs the detection signal SOUT representing the quantity of received light of the photo-diode D1 as described above, the timing signal generation portion 44 outputs the timing signals PR and SRT to the transistor TR0 and to the shift register 34, respectively, from the rise of the clock signal CLK9 input at the ninth time to the rise of the next (tenth) clock signal CLK10, then starts the detection operation of the quantity of received light to the photo-diode D2 as the next pixel, and thereafter sequentially executes the detection operation of the quantity of received light for all the pixels using the eight clock signals CLX as one unit in the same way as described above.

Figure 8:
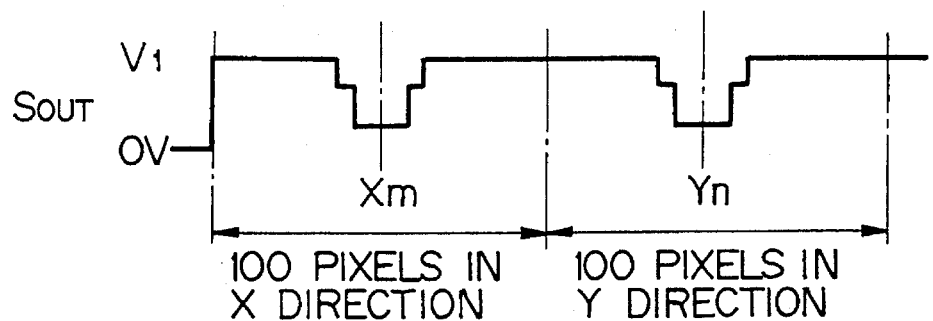
FIG. 8 is an explanatory view useful for explaining a detection signal SOUT output from the signal processing circuit 28.

Accordingly, the signal processing circuit 28 sequentially outputs the detection signals SOUT representing the quantity of received light of the photodiodes D1 to D200 constituting the photo-diode arrays 26X, 26Y, as shown in FIG. 8.

Among the detection signals SOUT, the signals for the first 100 pixels represent the quantity of received light of the photo-diodes D1 to D100 aligned in the X direction and constituting the photo-diode array 26X, and the signals for the next 100 pixels represent the quantity of received light of the photo-diodes D101 to D200 aligned in the Y direction and constituting the photo-diode array 26Y. Accordingly, among the detection signals SOUT for each of the 100 pixels, the signals for about 15 pixels become smaller than the reference voltage V1 due to the reception of light of the slit beam B shown in FIG. 4 and among them, the pixel at the center has a lower detection signal level.

Figure 4:
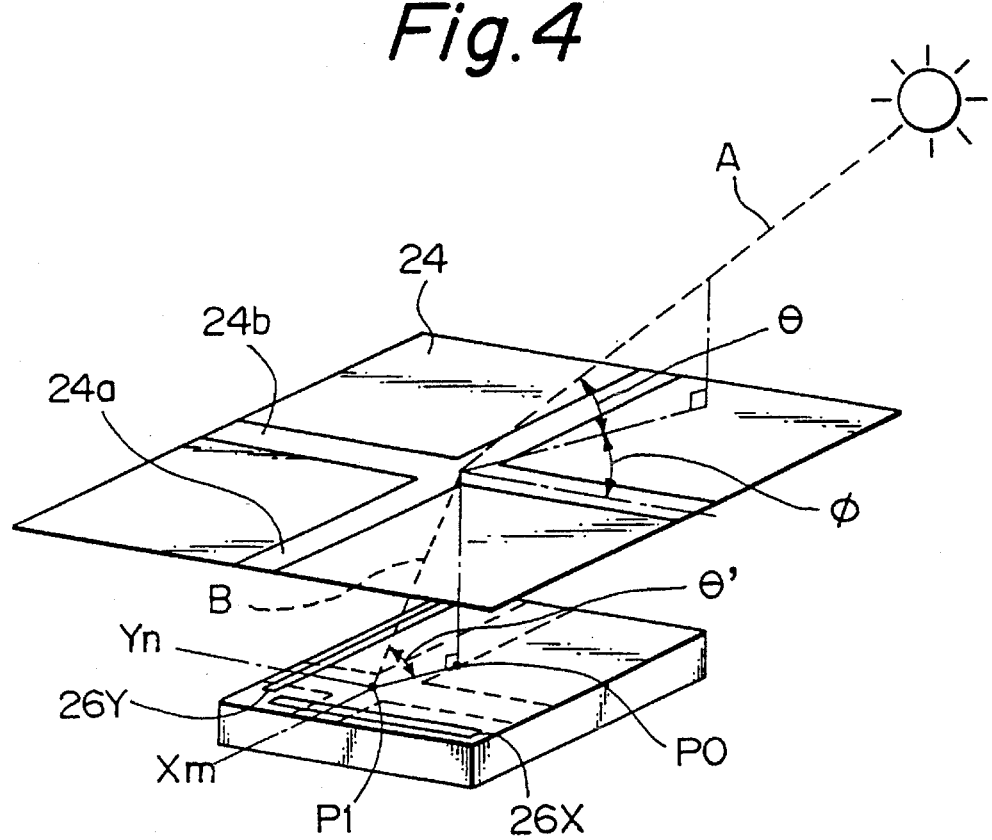
FIG. 4 is an explanatory view showing an incident state of solar rays into the optical position sensor 1.

Therefore, in order to detect the intensity and direction of insolation (the incident angle $\phi$ and the elevation angle $\theta$ to the solar rays) using the optical position sensor 1 according to this embodiment, the microcomputer 30 first operates the optical position sensor 1 as described above, samples the detection signals SOUT sequentially output from the optical position sensor 1 for each pixel, and detects the center pixel (Xm, Yn) of the pixels having the lowest level among the detection signals thus sampled. The deviation of this center pixel (Xm, Yn) from the pixel (X0, Y0) corresponding to the reference position P0 on the light reception portion 26 shown in FIG. 4 is then determined, and the center pixel (Xm, Yn) is converted to X and Y components of the vector representing the direction of the sun. Thereafter, the intensity I and the direction of the insolation (the incident angle $\phi$ and the elevation angle $\theta$) are calculated using this conversion result X, Y.

The following formulas (1) to (4) are used for this calculation:

$$\cos\theta' = \sqrt{\frac{X^2 + Y^2}{X^2 + Y^2 + t^2}} \quad (1)$$

$$\theta = \cos^{-1}(k \cdot \cos\theta') \quad (2)$$

$$\phi = \cos^{-1}(Y/\sqrt{X^2 + Y^2}) \quad (3)$$

$$i = Io/\sin\theta \quad (4)$$

In other words, as shown in FIG. 4, the elevation angle $\theta'$ obtained from the slit beam B incident into the light reception portion 26 is affected by the refractive index k of the glass substrate 22 and the silicone gel 29 as the intermediate medium between the slits 24a, 24b and the light reception portion 26. Therefore, the elevation angle $\theta$ of the intermediate medium is first determined in accordance with the formula (1), and then the elevation angle $\theta$ of the solar ray is calculated using the value $\theta'$ and the refractive index k (=$\cos\theta/\cos\theta'$) of the intermediate medium in accordance with the formula (2).

In the formula (1) given above, t represents the distance between the slits 24a, 24b and the photo-diode arrays 26X, 26Y or in other words, the thickness of the intermediate medium comprising the glass substrate 22 and the silicone gel 29. When the elevation angle $\theta$ of the solar rays is calculated using the formula (2), no problem occurs even when the elevation angle $\theta$ is calculated by regarding the silicone gel 29 as part of the glass substrate 22 having a refractive index of 1.5 and regarding the refractive index k in the formula (2) as the refractive index, i.e., 1.5, of the glass substrate 22, because the silicone gel 29 is extremely thin when compared with the glass substrate 22.

Next, the incident angle $\phi$ is not affected by the refractive index k of the intermediate medium. Accordingly, it is determined in accordance with the formula (3) described above. The intensity of insolation I is obtained by first calculating the voltage value of the center pixel (Xn, Yn), which changes with the intensity of light, so as to determine the intensity of insolation Io on the center pixel (Xn, Yn), and substituting this value in the formula (4).

As described above, the optical position sensor 1 according to this embodiment has a construction wherein the solar rays (slit beams) passing through the crisscross slits 24a, 24b are detected by the pair of photodiode arrays 26X and 26Y.

Accordingly, in comparison with the prior art devices using the two-dimensional light reception sensor, this embodiment can reduce the number of photodiodes constituting the pixels. In other words, this embodiment uses two uni-dimensional photo-diodes, the total number of pixels is 200 (pixels). However, if the two-dimensional light reception sensor is to be constituted by the same number of photo-diodes as in the present embodiment so as to obtain a detection signal having the same resolution, the number of pixels must be increased to 10,000 pixels (100 pixels×100 pixels). In other words, the present embodiment can drastically reduce the number of necessary photo-diodes.

Because the number of photo-diodes can thus be decreased, the construction of the signal processing circuit 28 is much simpler than the prior art device using the two-dimensional light reception sensor, and the size of the device can be reduced, too. Moreover, because the photo-diode arrays 26X, 26Y and the signal processing circuit 28 can be formed into the same chip shape, the device can be miniaturized.

When the intensity and direction of the insolation are detected on the side of the microcomputer 30, the detection signals for 10,000 pixels must be processed in the prior art device using the two-dimensional light reception sensor and the processing time becomes extended. According to this embodiment, however, only the signals of 200 pixels must be processed and the processing time on the side of the microcomputer 30 can therefore be reduced. In other words, the intensity and direction of the insolation can be detected within a shorter time than in prior art devices.

Further, according to this embodiment, the glass substrate 22 and the silicone gel 29 are disposed between the slits 24a, 24b and the photo-diode arrays 26X, 26Y and the slit beam is incident into the photo-diode arrays 26X, 26Y through this glass substrate 22 and the silicone gel 29. Accordingly, in comparison with the case where the gap between the slits 24a, 24b and the photo-diode arrays 26X, 26Y is left as a mere space, the change of the light reception position to the photo-diode arrays 26X, 26Y with respect to the change of the incident angle of the solar rays into the slits 24a, 24b becomes smaller, and the photo-diode arrays 26X, 26Y can be made more compact.

Figure 9A:
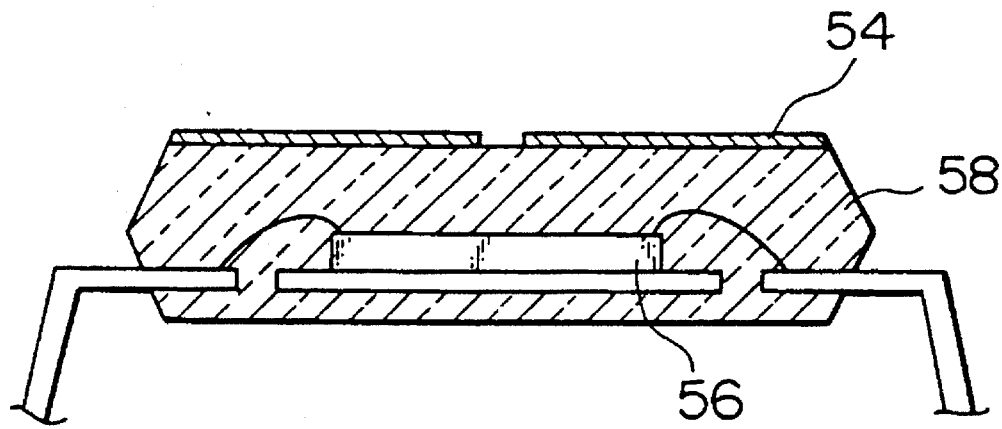
FIGS. 9A and 9B are explanatory views showing another example of the structure of the detection element portion 10.
Figure 9B:
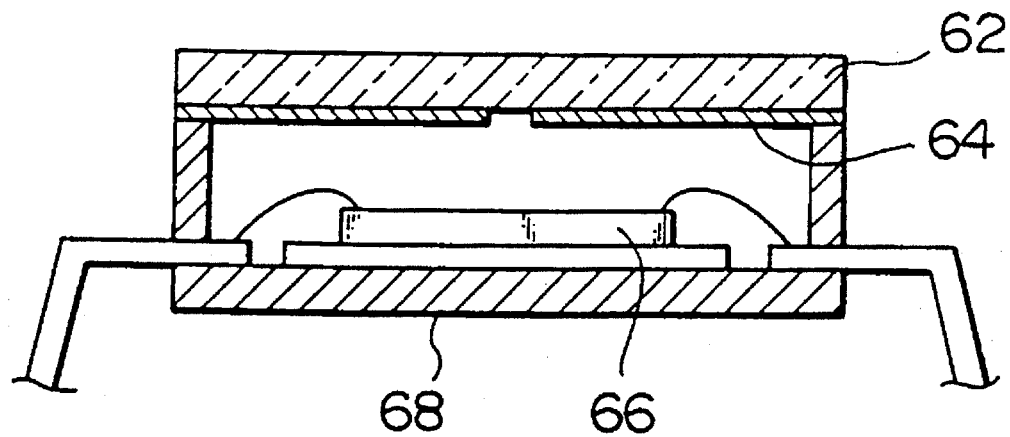

In the embodiment described above, the detection element portion 10 is formed by disposing the light shading film 24 and the light reception portion 26 on each of the front and back of the glass substrate 22. However, the detection element portion 10 may be formed by molding the light reception portion 56 from a transparent resin 58 having a refractive index of 1.4 to 1.5 and then forming the light shading film 54 on the surface of this resin 54 as shown in FIG. 9(a), for example. Furthermore, the detection element portion 10 may be formed by storing the light reception portion 66 in a hollow ceramic package 68, and disposing the glass substrate 62 having formed the light shading film 64 on the upper open portion thereof as shown in FIG. 9(b), for example.

In the embodiment described above, the light reception portion 26 is constituted into the CMOS type image sensor by the signal processing circuit 28, but various known light reception devices such as an image sensor using a charge-coupled device (CCD) can also be used besides such a CMOS type image sensor.

Figure 10:
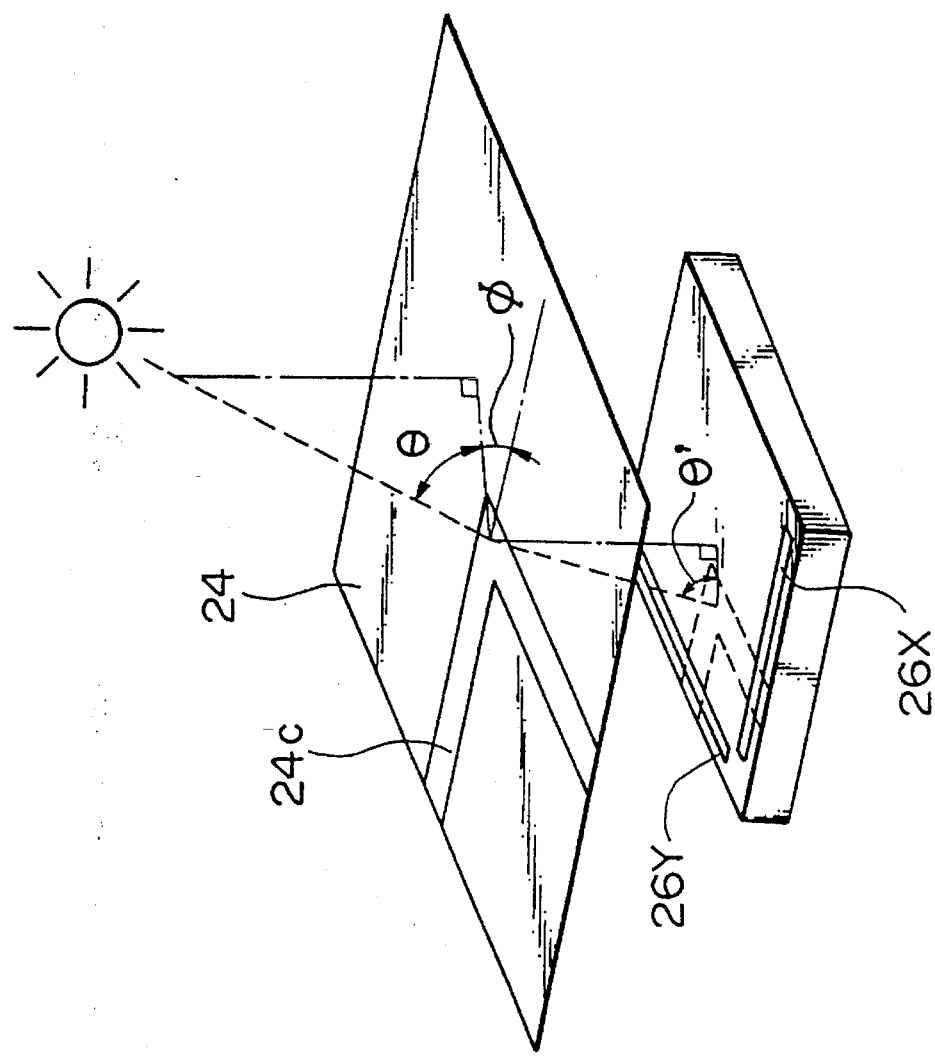
FIG. 10 is an explanatory view showing another example of the shape of a slit formed in a light shading film.

Further, in the embodiment described above, the slits 24a and 24b are disposed so as to perpendicularly cross each other in a criss-cross shape, but they need not be disposed in a crisscross fashion. For example, an L-shaped slit 24c may be formed by disposing the two slits in such a manner as to meet each other at one of their ends, as shown in FIG. 10, for example. In short, the two slits may meet each other on their extension.

When the L-shaped slit 24c is formed on the shading film 24 as shown in FIG. 10, the quantity of light irradiating the signal processing circuit 28 becomes smaller than when the slits are formed into the crisscross shape as in the embodiment. Therefore, it becomes possible to prevent the signal processing circuit 28 from operating erroneously. In other words, when the rays of light irradiate the signal processing circuit 28 for a long time, the temperature of internal devices of the circuit 28 rises and the erroneous operation of this circuit 28 might occur. When the slit is shaped into the L shape, however, the quantity of light irradiating the signal processing circuit 28 becomes smaller than in the case of the criss-cross slit, so that the rise of the temperature of the internal devices can be restricted and the erroneous operation of the circuit can be prevented.

When the L-shaped slit 24c is formed on the light shading film 24 as described above, position detection cannot be effected when the incident beam irradiates the photo-diode array 26X from the slit which is in parallel with this photo-diode array 26X or when the incident beam irradiates the photo-diode 26Y from the slit which is in parallel with this photo-diode 26Y, in the same way as in the embodiment described above wherein two slits 24a, 24b are shaped into the criss-cross shape in the light shading film 24. It is therefore preferred to dispose each photo-diode array 26X, 26Y outside the position at which the incident beam from the slit in parallel with each photo-diode array is refracted by the glass substrate 22 and is then allowed to irradiate each photodiode array when the sun is at a low altitude, in the same way as in the embodiment given above. According to this arrangement, only the incident beam from the slit orthogonal to each photo-diode array 26X, 26Y irradiates each photo-diode array 26X, 26Y, and position detection can always be carried out correctly.

Next, the crossing angle of the two slits 24a, 24b need not always be 90 degrees. In other words, because the position of incidence to the slit beam changes in accordance with the direction of the insolation on the opposed photo-diode arrays, the requirement for these slits 24a, 24b is that they can calculate the direction of the insolation from this changed position. Therefore, the slits 24a, 24b need not always be so disposed as to criss-cross each other as they do in the embodiment described above.

Similarly, each photo-diode array so disposed as to oppose each slit need not always be orthogonal. Moreover, the photo-diode array need not be formed linearly. In other words, what is required for the photo-diode array is that it can detect the position of the slit beam in the X- and Y-directions. Accordingly, the photo-diode array may be curved so as to avoid the signal processing circuit, for example.

The optical position sensor according to the present invention has thus been explained in terms of embodiment thereof wherein it is applied to a so-called "insolation sensor" for the air-conditioner of a car. Besides such an insolation sensor, the optical position sensor according to the present invention can be used as an optical position sensor for detecting the direction of incidence and intensity of light from a predetermined light source, and a position sensor for detecting a fitting position thereof using the light source described above as the reference position on the basis of the detection result of the sensor described above.

As described above, the optical position sensor according to present invention can detect the direction of incidence of light and its intensity by the use of two sets of unidimensional light reception sensors.

Accordingly, in comparison with the prior art sensors using the two-dimensional light reception sensors, the present invention can reduce the number of photo-electric conversion devices forming the pixels and can reduce the light reception area of the light reception portion. Because the number of photo-electric conversion devices can be reduced, the signal processing circuit for processing the received light signal from each photo-electric conversion device can be simplified and can be miniaturized. Because the light reception portion can be formed by two sets of the unidimensional light reception sensors, a space for forming the signal processing circuit can be secured at the light reception portion by forming the light reception portion into a shape equivalent to the shape of the two-dimensional light reception sensors.

As a result, unlike the prior art devices using the two dimensional light reception sensors, it is not necessary to separately form the light reception sensor and the signal processing circuit. Hence, the position sensor can be made more compact in size than the position sensor using the two-dimensional light reception sensors. Because each light reception sensor and the signal processing circuit can be integrated, the number of components of the optical position sensor can be reduced, and the assembly work becomes easier.

Further, because the number of the photo-electric conversion devices to be connected to the signal processing circuit is small, the number of signal lines connecting the light reception sensors to the signal processing circuit becomes small even when they are formed as discrete devices, the connecting work can be carried out easily, so that there is no decrease in the rate of production.

According to the optical position sensor of the present invention, the solar ray irradiates the shading plate. Therefore, the direction and intensity of the insolation can be detected from the light receiving position and reception intensity to light at the light reception sensors. Because the construction can be simplified and the size can be reduced, the optical position sensor can be easily mounted in a car, and can be optimally used as a so-called "insolation sensor" for the air-conditioner of the car.

In the optical position sensor of the present invention, the transparent member having a refractive index greater than 1 is interposed between the shading plate and the light reception portion. Therefore, in comparison with the case where the shading plate and the light reception portion are so disposed as to merely oppose each other, the change of the light receiving position with respect to the change of the incidence angle of the solar ray to the shading plate becomes smaller at the light reception portion, and the light reception sensor can be made more compact in size.

We claim:

1. An optical position sensor comprising:
   a light shading plate having a first slit and a second slit, as light introduction ports, defined therein, said first slit and said second slit intersecting each other; and
   a light reception portion including a first unidimensional light reception sensor and a second unidimensional light reception sensor, said first and second unidimensional light reception sensors being disposed so as to oppose said light shading plate with a predetermined gap therebetween, said first and second unidimensional light reception sensors including a plurality of photoelectric conversion devices, said first unidimensional light reception sensor being disposed so as to cross only said first slit and said second unidimensional light reception sensor being disposed so as to cross only said second slit.

2. An optical position sensor according to claim 1, wherein a transparent member having a predetermined refractive index greater than 1 is interposed between said light shading plate and said light reception portion.

3. An optical position sensor according to claim 2, wherein said transparent member is selected from a group consisting of a silicone gel and a transparent resin.

4. An optical position sensor according to claim 3, wherein said light shading plate is deposited and formed on one of the surfaces of said transparent resin molded in such a manner as to cover said light reception portion.

5. An optical position sensor according to claim 3, wherein said silicone gel as said transparent member is interposed between said glass substrate having said light shading plate deposited and formed thereon and said light reception portion, and fixes them together.

6. An optical position sensor according to claim 2, wherein said light shading plate is deposited and formed on a glass substrate.

7. An optical position sensor according to claim 1, wherein said two slits and the pair of said photo-electric conversion devices perpendicularly cross one another.

8. An optical position sensor according to claim 1, wherein said light reception portion includes a signal processing circuit for inputting signals from a plurality of said photo-electric conversion devices and outputting processed signals after executing control processing on the basis of said input signals, said signal processing circuit outputting optical detection signals representing that light irradiates said photoelectric conversion device, when said signal processing circuit inputs a signal from said photo-electric conversion device irradiated by light, from among a plurality of said photo-electric conversion devices.

9. An optical position sensor comprising:
 a light shading plate having two slits defined therein serving as light introduction ports, said slits being located such that said two slits intersect each other; and
 a light reception portion including a pair of unidimensional light reception sensors disposed so as to oppose said light shading plate with a predetermined gap therebetween, said pair of unidimensional light reception sensors being defined by a plurality of photo-electric conversion devices aligned in a manner so as to cross each of said slits at a position opposing each of said slits, wherein said two slits and said pair of photo-electric conversion devices perpendicularly cross one another, and wherein said two slits criss-cross each other, and said pair of photo-electric conversion device are arranged into an L shape.

10. An optical position sensor comprising:
 a light shading plate having two slits defined therein serving as light introduction ports, said slits being located such that said two slits intersect each other; and
 a light reception portion including a pair of unidimensional light reception sensors disposed so as to oppose said light shading plate with a predetermined gap therebetween, said pair of unidimensional light reception sensors being defined by a plurality of photo-electric conversion devices aligned in a manner so as to cross each of said slits at a position opposing each of said slits, wherein said two slits and said pair of photo-electric conversion devices perpendicularly cross one another, wherein said two slits are arranged into an L shape, and said pair of photo-electric conversion device are arranged into an L shape.

11. An optical position sensor according to claim 9 or 10, wherein a plurality of said photo-electric conversion devices and said signal processing circuit are disposed on one chip.

12. An optical position sensor according to claim 11, which further includes a microcomputer for outputting a signal for sequentially inputting the signals from a plurality of said photo-electric conversion devices to said signal processing circuit.

13. An optical position sensor comprising:
 a light shading plate having two slits defined therein serving as light introduction ports, said slits being located such that said two slits intersect each other;
 a light reception portion including a pair of unidimensional light reception sensors disposed so as to oppose said light shading plate with a predetermined gap therebetween, said pair of unidimensional light reception sensors being defined by a plurality of photo-electric conversion devices aligned in a manner so as to cross each of said slits at a position opposing each of said slits; and
 a light transmissible filter covering said light shading plate.

14. An isolation sensor comprising:
 a light shading plate having a first slit and a second slit, as light introduction ports, defined therein, said first slit and said second slit intersecting each other; and
 a light reception portion including a first unidimensional light reception sensor and a second unidimensional light reception sensor, said first and second unidimensional light reception sensors being disposed so as to oppose said light shading plate with a predetermined gap therebetween, said first and second unidimensional light reception sensors including a plurality of photo-electric conversion devices, said first unidimensional light reception sensor being disposed so as to cross only said first slits at a and said second unidimensional light reception sensor being disposed so as to cross only said second slit.

15. An insolation sensor according to claim 14, wherein a transparent member having a predetermined refractive index greater than 1 is interposed between said light shading plate and said light reception portion.

16. An insolation sensor according to claim 14, wherein said transparent member is selected from a group consisting of a silicone gel and a transparent resin.

17. An insolation sensor according to claim 16, wherein said light shading plate is deposited and formed on a glass substrate.

18. An insolation sensor according to claim 16, wherein said light shading plate is deposited and formed on one of the surfaces of said transparent resin molded in such a manner as to cover said light reception portion.

19. An insolation sensor according to claim 16, wherein said silicone gel as said transparent member is interposed between said glass substrate having said light shading plate deposited and formed thereon and said light reception portion, and fixes them together.

20. An insolation sensor according to claim 14, wherein said two slits and the pair of said photoelectric conversion devices perpendicularly cross one another.

21. An insolation sensor according to claim 14, wherein said light reception portion includes a signal processing circuit for inputting signals from a plurality of said photo-electric conversion devices and outputting processed signals after executing control processing on the basis of said input signals, said signal processing circuit outputting optical detection signals representing that light irradiates said photo-electric conversion device, when said signal processing circuit inputs a signal from said photo-electric conversion device irradiated by light, from among a plurality of said photo-electric conversion devices.

22. An insolation sensor according to claim 21, which further includes a microcomputer for outputting a signal for sequentially inputting the signals from a plurality of said photo-electric conversion devices to said signal processing circuit.

23. An insolation sensor according to claim 14, wherein said shading plate and said reception portion are disposed inside a compartment of a car.

24. An insolation sensor comprising:
 a light shading plate having two slits defined therein serving as light introduction ports, said slits being located such that said two slits intersect each other; and
 a light reception portion including a pair of unidimensional light reception sensors disposed so as to oppose said light shading plate with a predetermined gap therebetween, said pair of unidimensional light reception sensors being defined by a plurality of photo-electric conversion devices aligned in a manner so as to cross each of said slits at a position opposing each of said slits, wherein said two slits and said pair of photo-electric conversion devices perpendicularly cross one another, and wherein said two slits criss-cross each other, and said pair of photo-electric conversion device are arranged into an L shape.

25. An insolation sensor comprising:
 a light shading plate having two slits defined therein serving as light introduction ports, said slits being located such that said two slits intersect each other; and
 a light reception portion including a pair of unidimensional light reception sensors disposed so as to oppose said light shading plate with a predetermined gap therebetween, said pair of unidimensional light reception sensors being defined by a plurality of photo-electric conversion devices aligned in a manner so as to cross each of said slits at a position opposing each of said slits, wherein said two slits and said pair of photo-electric conversion devices perpendicularly cross one another, wherein said two slits are arranged into an L shape, and said pair of photo-electric conversion device are arranged into an L shape.

26. An insolation sensor according to claim 24 or 25, wherein a plurality of said photo-electric conversion devices and said signal processing circuit are disposed on one chip.

27. An insolation sensor comprising:
 a light shading plate having two slits defined therein serving as light introduction ports, said slits being located such that said two slits intersect each other;
 a light reception portion including a pair of unidimensional light reception sensors disposed so as to oppose said light shading plate with a predetermined gap therebetween, said pair of unidimensional light reception sensors being defined by a plurality of photo-electric conversion devices aligned in a manner so as to cross each of said slits at a position opposing each of said slits; and
 a light transmissible filter covering said light shading plate.

* * * * *